United States Patent
Yahyavi Firouz Abadi et al.

(10) Patent No.: US 11,748,412 B2
(45) Date of Patent: *Sep. 5, 2023

(54) EXPLORABLE VISUAL ANALYTICS SYSTEM HAVING REDUCED LATENCY IN LOADING DATA

(71) Applicant: Palo Alto Networks, Inc., Santa Clara, CA (US)

(72) Inventors: Seyed Amir Yahyavi Firouz Abadi, San Jose, CA (US); Saman Amirpour Amraii, Redlands, CA (US); Laleh Roosta Pour, San Jose, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/244,395

(22) Filed: Apr. 29, 2021

(65) Prior Publication Data

US 2021/0248188 A1    Aug. 12, 2021

Related U.S. Application Data

(63) Continuation of application No. 16/228,185, filed on Dec. 20, 2018, now Pat. No. 11,030,249.
(Continued)

(51) Int. Cl.
*G06F 16/90*    (2019.01)
*G06F 17/10*    (2006.01)
(Continued)

(52) U.S. Cl.
CPC .......... *G06F 16/9027* (2019.01); *G06F 7/14* (2013.01); *G06F 16/221* (2019.01);
(Continued)

(58) Field of Classification Search
CPC .............. G06F 16/9027; G06F 16/221; G06F 16/2379; G06F 16/2246; G06F 16/26;
(Continued)

(56) References Cited

U.S. PATENT DOCUMENTS 6,532,017 B1   3/2003   Knittel
2002/0033837 A1   3/2002   Munro
(Continued)

FOREIGN PATENT DOCUMENTS

EP   2477363   7/2012

OTHER PUBLICATIONS

Amraii et al., Explorable Visual Analytics, Knowledge Discovery in Large and High-Dimensional Data, Aug. 24, 2014.
(Continued)

*Primary Examiner* — Hares Jami
(74) *Attorney, Agent, or Firm* — Van Pelt, Yi & James LLP

(57) ABSTRACT

A method and system for processing datasets having a number of data points are described. A tree corresponding to the dataset and having multiple levels is provided. Each level includes a portion of the number of data points organized into tile(s). The levels are based on the number of data points and client resource(s). A manifest indicating a particular number of data points in each tile for each level of the tree is provided and sent to a client. A request for a portion of the tile(s) of a level of the plurality of levels is received from the client. The portion of the tile(s) corresponds to a portion of the dataset and is determined based on the manifest. The portion of the tile(s) includes not more than a maximum number of data points corresponding to the at least one client resource.

20 Claims, 8 Drawing Sheets

Related U.S. Application Data

(60) Provisional application No. 62/739,788, filed on Oct. 1, 2018.

(51) Int. Cl.

| | | |
|---|---|---|
| *G06F 16/22* | (2019.01) | |
| *G06F 16/901* | (2019.01) | |
| *G06F 16/904* | (2019.01) | |
| *G06F 16/23* | (2019.01) | |
| *G06F 16/26* | (2019.01) | |
| *G06F 7/14* | (2006.01) | |

(52) U.S. Cl.
CPC ...... *G06F 16/2246* (2019.01); *G06F 16/2379* (2019.01); *G06F 16/26* (2019.01); *G06F 16/904* (2019.01); *G06F 17/10* (2013.01)

(58) Field of Classification Search
CPC .......... G06F 16/904; G06F 16/29; G06F 7/14; G06F 17/10
See application file for complete search history.

(56) References Cited

U.S. PATENT DOCUMENTS

| | | |
|---|---|---|
| 2005/0273573 A1 | 12/2005 | Liu |
| 2008/0127145 A1 | 5/2008 | So |
| 2009/0324132 A1* | 12/2009 | Joy ...................... G06V 10/469 382/282 |
| 2011/0258575 A1 | 10/2011 | Cupp |
| 2011/0261049 A1* | 10/2011 | Cardno .................. G06Q 40/04 345/419 |
| 2012/0020537 A1 | 1/2012 | Garcia |
| 2013/0117322 A1 | 5/2013 | Fischer |
| 2013/0145473 A1 | 6/2013 | Cormode |
| 2015/0109338 A1* | 4/2015 | McKinnon .............. G06F 16/58 345/633 |
| 2015/0128150 A1 | 5/2015 | Ueda |
| 2016/0124992 A1* | 5/2016 | Alesiani ................ G06F 16/285 707/737 |
| 2017/0141790 A1 | 5/2017 | Gopal |
| 2017/0193629 A1 | 7/2017 | Subramaniyan |
| 2017/0262464 A1* | 9/2017 | Lee ..................... G06F 16/2246 |
| 2017/0323028 A1* | 11/2017 | Jonker ................ G06F 16/9024 |
| 2018/0348961 A1 | 12/2018 | Wilczynski |
| 2019/0065563 A1 | 2/2019 | Petculescu |
| 2019/0236403 A1* | 8/2019 | Lilley .................. G06V 10/757 |

OTHER PUBLICATIONS

Amraii et al., Exporable Visual Analytics (EVA) Interactive Exploration of LEHD, Cargegie Mellon University, Jun. 2015.

Amraii et al., Interactive Exploration of LEHD, A Case Study in Knowledge Discovery, Sep. 24, 2014.

Amraii et al., Knowledge Discovery in Large and High-Dimensional Space, Apr. 5, 2014.

Huguenin et al., Cheat Detection and Prevention in P2P MOGs, IEEE, 2011.

Pour et al., Algebraic Reasoning for SHIQ, Concordia University, Jun. 7, 2012.

Saman Amirpour Amraii, Human-Data Interaction in Large and High-Dimensional Data, University of Pittsburgh, Nov. 27, 2017.

Seyed Amir Yahyavi Firouz Abadi, On the Scalability and Security of Distributed Multiplayer Online Games, School of Computer Science, McGill University, Apr. 2014.

Wang et al., I Know What you Did on Your Smartphone: Inferring APP Usage over Encrypted Data Traffic, 2015 IEEE Conference on Communications and Network Security (CNS), pp. 433-441, 2015.

Yahyavi et al., AntReckoning: Dead Reckoning Using Interest Modeling by Pheromones, IEEE, 2011.

Yahyavi et al., Interest Modeling in Games: The Case of Dead Reckoning, Multimedia Systems, (2013, 19:255-270, Jul. 7, 2012.

Yahyavi et al., Peer-to-Peer Architectures for Massively Multiplayer Online Games: A Survey, ACM Computing Surveys, vol. 46, No. 1, Article 9, Oct. 2013.

Yahyavi et al., Towards Providing Security for Mobile Games, MobiArch'13, pp. 47-52, Oct. 4, 2013.

Yahyavi et al., Towards the Design of a Human-Like FPS NPC using Pheromone Maps, 2013 IEEE International Games Innovation Conference (IGIC), pp. 275-282, 2013.

Yahyavi et al., Watchmen: Scalable Cheat-Resistant Support for Distributed Multi-Player Online Games, 2013 IEEE 33rd International Conference on Distributed Computing Systems, pp. 134-144, 2013.

* cited by examiner

EXPLORABLE VISUAL ANALYTICS SYSTEM HAVING REDUCED LATENCY IN LOADING DATA

CROSS REFERENCE TO OTHER APPLICATIONS

This application is a continuation of U.S. patent application Ser. No. 16/228,185 entitled EXPLORABLE VISUAL ANALYTICS SYSTEM HAVING REDUCED LATENCY IN LOADING DATA filed Dec. 20, 2018, which claims priority to U.S. Provisional Patent Application No. 62/739,788 entitled SYSTEM AND METHOD FOR PERFORMING EXPLORABLE VISUAL ANALYTICS filed Oct. 1, 2018, both of which are incorporated herein by reference for all purposes.

BACKGROUND OF THE INVENTION

Big data involves datasets that may not be stored in the memory of a single computing unit, which makes working with big data challenging. From the standpoint of a browser, or client, the datasets may include millions or billions of data points. Consequently, all of the data points in the dataset cannot be loaded onto a client. Increasingly, big data is desired to be used to understand and predict trends in a variety of fields. In order to utilize big data, tools that allow users to interactively explore, intuitively understand and draw conclusions from the data are desired. However, because of the size of the datasets, loading the requisite number of data points, performing analytics, rendering charts and other activities typically involve large latencies. Such latencies adversely affect the ability of tools to provide sufficient interactivity with the data. Accordingly, what is desired is an improved mechanism for utilizing large datasets.

BRIEF DESCRIPTION OF THE DRAWINGS

Various embodiments of the invention are disclosed in the following detailed description and the accompanying drawings.

DETAILED DESCRIPTION

Figure 1A:
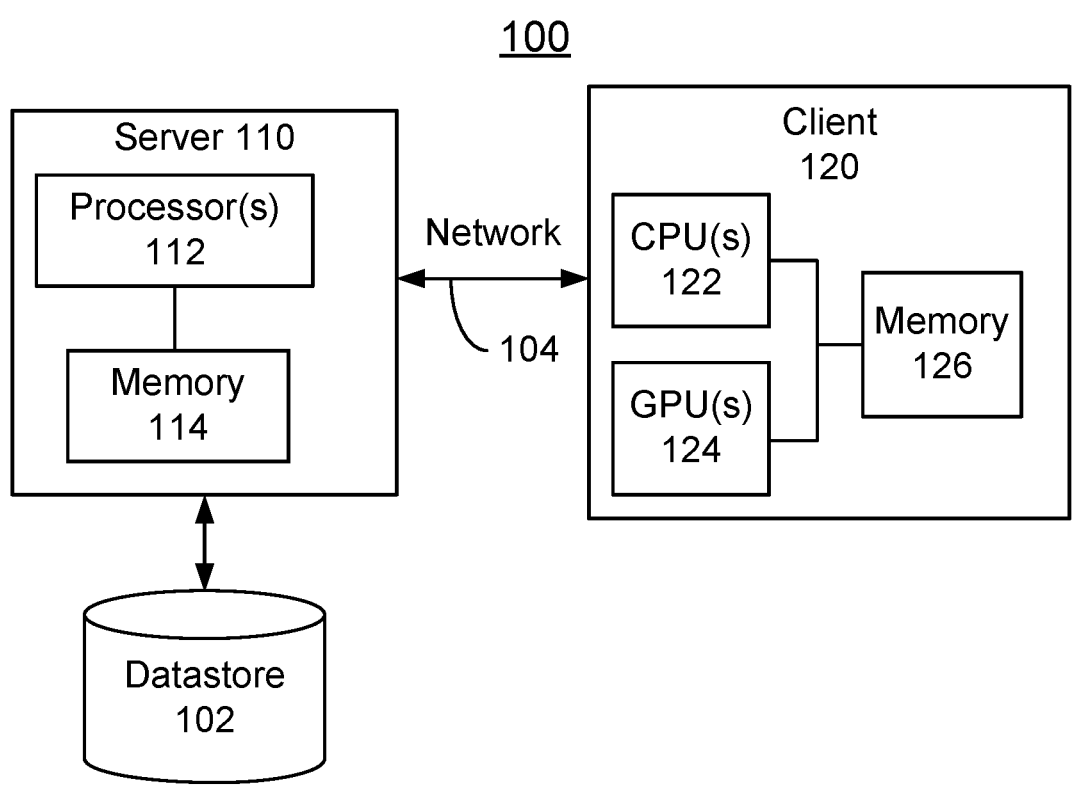
FIGS. 1A-1B are views illustrating an exemplary embodiment of a system for providing explorable visual analytics having reduced loading latency for very large datasets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for processing large datasets having large numbers of rows of data (also referred to as data points) are described. A tree corresponding to the dataset is generated. The tree has a plurality of levels. Each level includes a portion of the number of data points organized into at least one tile, or node. As used herein, portion includes some or all of a particular item. The levels are based on the total number of data points in the data set and targeted resource(s) of a client. Other considerations can be used in determining levels of a tree. For example, available disk space on the server and the amount of time pre-processing can be run on the server affect the number of levels in the tree because the more levels for a tree, the longer it takes to do the pre-processing and also the more disk space is allocated to the generated tiles. For example, a root level of a tree may only have a single if that tile does not have more than a maximum number of data points. As used herein, the maximum number of data points is selected as the highest number of data points loadable on the client in a particular amount of time. The actual number of data points in the maximum number of data points may be determined based on client or server settings. The maximum number of data points is estimated based on the target client resources. The next level of the tree may include more tiles and more data points than the root level. The increase in tiles and number of data points contained per level continues until the deepest, or leaf level of the tree is reached. This highest level includes a sufficient number of tiles to accommodate a 1:1 sampling ratio for the dataset. Separate tree(s) can be built for different levels of granularity for aggregation levels. The tree can be written in a binary format suitable for efficient loading into memory. The tree can also be further compressed to reduce the size (on disk and over the network). A manifest is also provided for the tree. The manifest indicates the particular number of data points in each tile for each level of the tree.

The manifest is provided to the client. A request for one or more of the tiles of a level of the tree is received from the client. The request is based on the manifest and corresponds to a portion of the dataset desired by the client. The portion of the tile(s) requested includes not more than the maximum number of data points determined in the client or server settings. The compressed portions of the tile(s) are sent to the client in response to the request.

At the client, the manifest is received. Based on the manifest, the client determines a level of the tree and tile(s) for the level that include a portion of the dataset desired to be received and include not more than the maximum number of data points. A request for the portion of the tile(s) of the level is sent. Corresponding compressed data are received in response. The received data are uncompressed, processed and used in analytics and/or visualization.

Figure 1B:
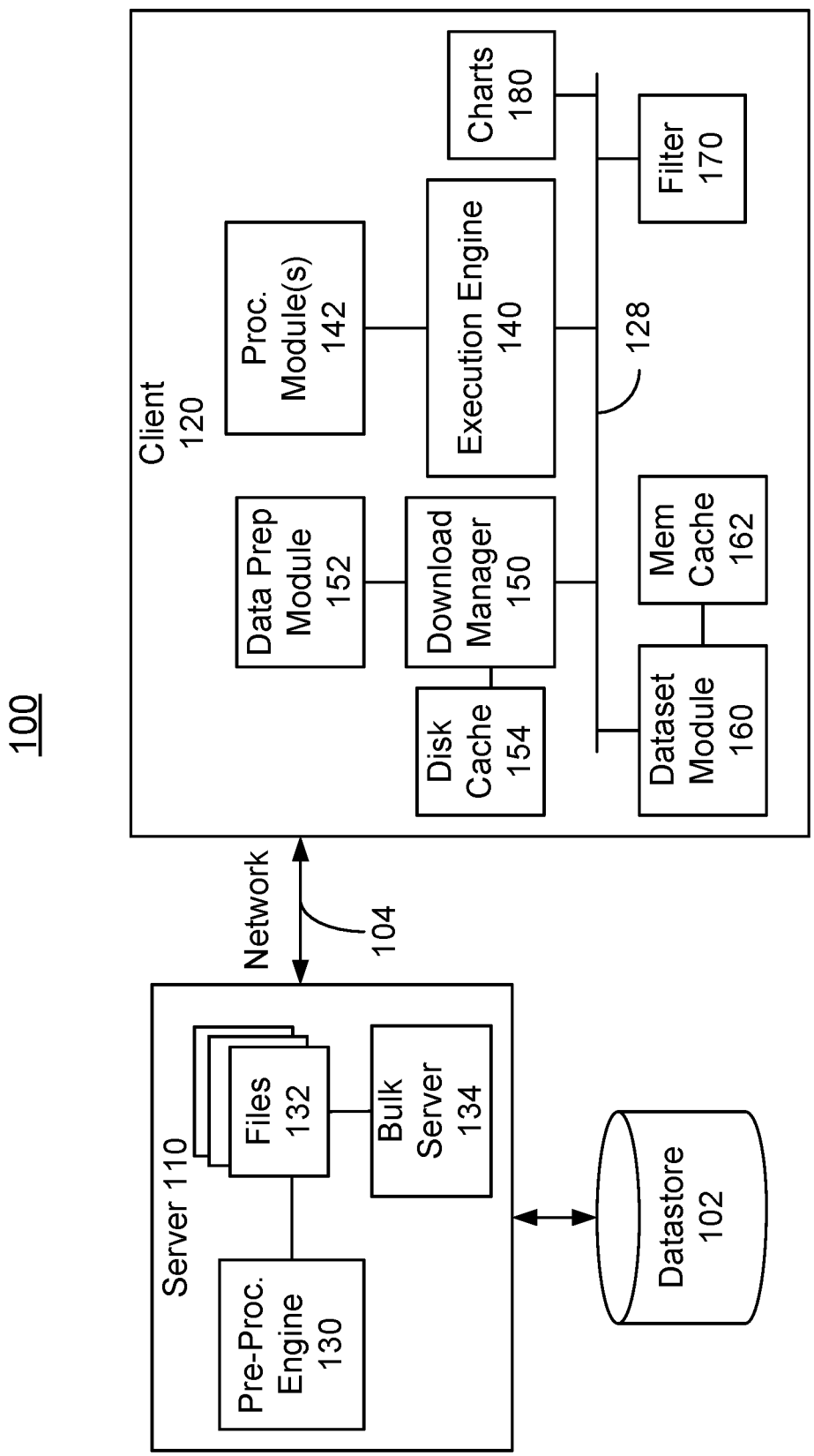

FIGS. 1A-1B are block diagrams of an embodiment of system 100 used for analyzing and visualizing large datasets. In particular, FIG. 1A illustrates one view of an embodiment of a server 110 and client 120 coupled via a network 104. For simplicity, only certain portions of server 110 and client 120 are shown in FIG. 1A. Further, although only one client 120 is shown as coupled to server 110, multiple clients typically utilize server 110. Server 110 includes at least one processor 112 and memory 114. Processor(s) 112 may include multiple cores. Processor(s) 112 may include one or more central processing units (CPUs) and/or one or more graphical processing units (GPUs). Memory 114 can include a first primary storage, typically a random access memory (RAM), and a second primary storage area, typically a non-volatile storage such as solid state drive (SSD) or hard disk drive (HDD). Memory 114 stores programming instructions and data, in the form of data objects and text objects, in addition to other data and instructions for processes operating on processor(s) 112. Primary storage typically includes basic operating instructions, program code, data and objects used by processor(s) to perform its functions. Primary storage devices (e.g., memory 114) may include any suitable computer-readable storage media, described below, depending on whether, for example, data access needs to be bi-directional or uni-directional.

Similarly, client 120 includes CPU(s) 122, GPU(s) 124 and memory 126. CPU(s) 122 and GPU(s) each generally includes multiple cores. Memory 126 is analogous to memory 114 in that memory 126 may function as primary storage including basic operating instructions, program code, data and objects used by CPU(s) 122 and GPU(s) 124 to perform their functions.

Server 110 is coupled with datastore 102. Datastore 102 archives one or more very large datasets. For example, such a dataset may include tens of millions or billions of data points. Although only a single datastore 102 is shown, server 110 may be coupled with multiple datastores in some embodiments. Using instructions retrieved from memory 114, processor(s) 112 control the pre-processing and delivery of data from datastore 102.

FIG. 1B illustrates another view of an embodiment of system 100 including server 110, client 120, datastore 102 and network connection 104. Only some components of server 110 and client 120 are shown for clarity. Although described in the system 100, other computer architectures having different configurations of subsystems may also be utilized and such systems may be used to perform the methods as described herein.

Server 110 includes pre-processing engine 130, files 132 and bulk server 134. Server 110 is platform agnostic and may utilize Scala, Java, Apache Spark and/or analogous technologies for pre-processing engine 130 and/or bulk server 132. Pre-processing engine 130 prepares the dataset stored in datastore 102 for use by client 120. Pre-processing engine 130 may place the dataset in fully columnar format, index the dataset, build trees as discussed below, compress data, perform random sampling of data, build different aggregation levels of the data, and perform other analogous functions. In general, during the indexing process, the data is stored in tiles with a specific naming and folder hierarchy. For example, for a dataset including census data, pre-processing engine 130 may index the population data by latitude and longitude (i.e. geographically) to prepare the data for visualization on a map. In its simplest form, if indexing the data for latitude and longitude, pre-processing engine 130 may generate four tiles: tile_-180_0-90_0, tile_-180_0_0_90, tile_0_180-90_0, tile_0_180_0_90. These four tiles each correspond to a range of latitude and longitudes (e.g., from −180 to 0 and from −90 to 0, etc.). When a user requires a portion of the data, say 10-20 of longitude and 20-30 of latitude, server 110 can quickly find the file/tile that encompasses that portion of the data and send that over to client 120. In general, the process of building a tree is to create a series of indexes on top of the data (each level of the tree corresponds to one set of indexing). However, larger ranges (i.e., higher levels of the tree close to root) include many data points, often more than what client 120 can load (e.g. more than the maximum number of data points). Consequently, storing such tiles brings no added value. Instead, tiles on the higher levels (i.e., closer to the root) can be sampled versions of all the data points in that range, so that their size remains in a manageable range.

Files 132 are provided by pre-processing engine 130 and may include online analytical processing (OLAP) cubes indexed according to the desired columns of data. Bulk server 134 receives requests from client 120 and provides subsets of files 132 to client 120 in response to requests. Bulk server 134 may also serialize the data being provided to allow for more efficient delivery to client 120. Thus, bulk server 134 may function as a file server. In some embodiments, bulk server 134 may include a pass-through mode in which bulk server 134 directly queries datastore 102, compresses data to binary memories and sends the compressed binary memories to the client 120. In such embodiments, random sampling may be achieved using support provided by datastore 102, if any, or by server 110 sampling data in datastore 102.

Client 120 allows a user to visualize, perform analytics on and otherwise interact with data provided via server 110. Client 120 includes execution engine 140, download manager 150, dataset module 160, filter module 170 and chart module 180. In some embodiments, chart module 180 is specifically configured for use with components 140, 150, 160 and 170. In other embodiments, conventional chart modules might be used. Chart module 180 is used to provide visualizations of data provide by server 110. Filter modules 170 control layers for graphical depiction via chart module 180. Download manager 150 and dataset module 160 are coupled with caches 154 and 162, respectively. Download manager 150 and execution engine 140 can also create one or more instances of data preparation module 152 and processing modules 142, respectively. Data preparation modules 152 are thus used for parallel processing threads, as described below, at client 120. Similarly, processing modules 142 are used for parallel processing threads at client 120. Execution engine 140, download manager 150, dataset module 160, filter module 170 and chart module 180 communicate via message bus 128. Execution engine 140 receives data to be processed, controls parallel processing of data in processing modules 142 collects the results of the parallel processing and provides the results for display, storage, or sharing. Download manager 150 controls downloading of data from server 110 as well as unpacking/decompression of data, shape processing and other processing performed by data preparation workers 152 to prepare the downloaded data for consumption by client 120. Download manager 150 may also perform on-disk caching via cache 154 and garbage collection. Download manager 150 may also control the download rate for different data types, prioritizing certain data types over others or downloading some portions of the data faster than other portions based on a determined priority. Download manager 150 may also ensure that duplicate requests by different modules are not overlapped and the data is only downloaded once. Dataset module 160 determines the data to be downloaded based on information provided by server 110 and the views requested on client 120, as discussed below. In addition, dataset module 160 caches data in memory cache 162 and sends data to the execution engine 140 for processing.

Figure 2:
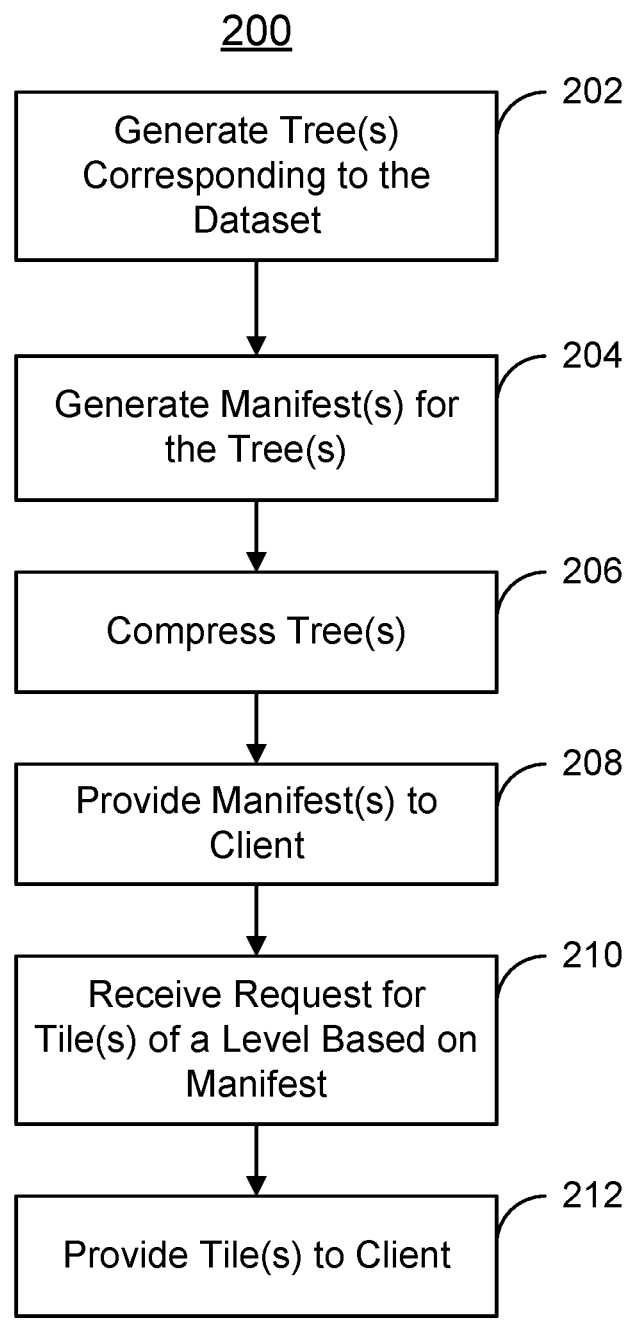
FIG. 2 is a flow chart depicting an embodiment of a method for providing explorable visual analytics having reduced loading latency for very large datasets.

FIG. 2 is a flow chart depicting an embodiment of method 200 for providing a large dataset for analyzing and visualizing the data. For simplicity, method 200 is described in the context of system 100. However, method 200 may be used in conjunction with other architectures. The method 200 is explained in the context of a single dataset. However, the method 200 may be extended to multiple datasets which might be joined. For example, demographics data for one dataset may be joined with sales data from another data set for analysis and visualization. In addition, the flow of method 200 is described in a particular order. However, other orders are possible and may be performed at disparate times. For example, some steps are performed during pre-processing of a dataset, while others involving communication between client 120 and server 110 are performed at run time, during live usage of client 120.

One or more trees corresponding to the dataset are generated, via 202. Pre-processing engine 130 builds the tree(s) at 202 for a dataset stored by datastore 102. Each tree provided at 202 has multiple levels. The total number of levels in the tree is based upon the number of data points in the data set and the resources of client 120 used in loading data. Thus, the number of levels in a tree and the maximum number of data points, described above, may be based on an estimate of how much data a representative client can load in a given amount of time. For example, a two to three year old laptop is generally capable of loading two to three million data points quickly. Consequently, the number of levels may be based on two to three million data points. For similar reason, the maximum number of data points may be selected not to exceed two or three million data points. In an alternate embodiment, the maximum number of data points and number of levels in a tree may be tailored to each client or to sets of clients. Other considerations, such as available disk spacer on server 110 and amount of time pre-processing can be run, can be used in determining levels of a tree.

Each level of the tree has at least one tile. The base, or root, level has a single tile. Subsequent levels have more tiles. For example, the tree formed at 202 may be a binary tree in which each tile on a particular level gives rise to two tiles on the next level, quad-tree in which each tile on a particular level gives rise to four tiles on the next level, an octo-tree in which each tile on a particular level gives rise to eight tiles on the next level, or another type of tree. The data points at each level of the tree are organized into the tiles. All of the data points in the data set are stored in the tree.

The levels of the tree built at 202 may be based on sampling or aggregation. In some embodiments, multiple trees are used in order to provide the desired visualizations to users of client 120. Because sampling and aggregation provide a different amount of detail at different levels of the tree, the levels of the tree formed at 202 may also be considered to be zoom levels for viewing data on client 120. For example, data for a root level or data for the leaf (deepest) level might be rendered on client 120. Data for the root level provides a less detailed view of a portion of the dataset than data for the deepest, leaf level. Thus, the zoom level may be the highest for visualizations of the leaf level and the lowest for the visualizations of the root level.

The levels of the tree may be sampling levels. In some embodiments, pre-processing engine 130 provides a random sampling for each sampling level of the tree. For example, suppose a dataset includes one billion points and that may not organized into a hierarchy. The deepest (leaf) level of the tree includes all one billion points spread over multiple tiles. The root level might include one million points sampled randomly from the one billion points, for a sampling ratio of 1:1000. In some embodiments, the sampling ratio for the root level is defined such that not more than a maximum number of data points are stored at the root level. In some embodiments, this maximum number of data points is predetermined. For example, a user may be allowed to select one million, two million, or three million as the maximum number of data points. Such a selection could be based upon the user's knowledge of the client resources for client 120. In some embodiments, the maximum number of data points is based on the most data points loadable onto client 120 within a specified amount of time. This may be determined by querying the user's system or based on an estimation of the resources available for most clients. The maximum number of data points may be a default number. Such a default maximum number of data points may be determined by estimating the largest number of data points expected to be loadable on an average client machine in a particular time. When rendered on client 120, data for the deepest level of the tree provides a more accurate view of the data set (higher zoom/1:1 sampling ratio) than data for the root level of the tree (lower zoom/lower sampling ratio). In some embodiments, a tree may have optional additional single-tile level(s). Stated differently, the root node of the tree has one or more single parent nodes in such embodiments. Such parent nodes are highly sub-sampled version of the root node. This structure is useful when the number of data points at a root is still very large-potentially greater than the maximum number of data points. In those cases, the sub-sampling parent nodes can be used for analytics and visualization.

The levels of the tree may be based on aggregation levels. Aggregation levels are based upon a logical hierarchy inherent to the dataset. For example, the dataset might include United States' census data that is indexed based on geographic location (e.g. latitude and longitude). The hierarchy for census data includes census blocks (most granular/highest level of detail), tracts (including a number of blocks/next most granular), counties (including tracts) and states (including all counties/least granular). In such a case, the levels of the tree may correspond to populations of census blocks, tracts, counties, states of the entire country. When rendered on client 120, data for blocks provides a more accurate view of the population over a smaller area (higher zoom/further from root level of the tree) than data for the states (lower zoom/at the root level of the tree). Other hierarchies indexed in other manners may be present in other datasets. For example, a dataset for air travel may include the following aggregation levels: individual passengers (most granular level), flights (including some of the passengers/next aggregation level), domestic airlines (including sets of flights) and all airlines (including domestic and international airlines). For such a dataset, the tree may include at least four levels corresponding to the four aggregation levels.

For some datasets, visualizations may be desired for both sampling and aggregation of the dataset. In some such embodiments, multiple, related trees are generated by pre-processing engine 130. In such an embodiment, a tree is generated based on sampling as discussed above. The raw data can then be aggregated to form a new, related dataset and separate sampling trees built for different aggregation levels of the aggregated raw data. Client 120 can iterate over these trees for the related datasets and show the data at different levels of different aggregation. Stated differently, client 120 can move from one sampling tree to another so that the user can intuitively navigate within the data across different aggregation levels, each provided from a layer of a different sampling tree for different aggregation levels. For example, in the census example above, one tree that is based on zip codes may be generated. Data for the zip codes can be aggregated to create a new raw dataset based on counties. A second tree based on these counties can be created. In either tree, the leaf layer (deepest layer) corresponds to the 1:1 sampling of the data and the upper layers (closer to root) correspond to a sampling of the data. The system can navigate within a tree (which in this case, zooming is equivalent of navigating across different sampling layers) or between multiple trees (which in this case, zooming is equivalent of navigating across different aggregation layers).

Pre-processing engine 130 creates a manifest for each tree, at 204. The manifest is used in providing to client 120 enough information to decide how to load a sufficiently large number of data points for use in analytics and visualizations while maintaining a sufficiently small latency for loading the data. Thus, the manifest can be used to provide the largest number of data points that is still less than a maximum number of data points corresponding to the client resources. To do so, the manifest indicates the exact number of data points in each tile for each level of the tree. The number of data points per tile may be provided because the data points may not be evenly distributed across the tiles of a level. In the census example above, tiles corresponding to counties may have very different numbers of data points. A county including an urban area, such as New York City or Chicago, may have a significantly larger number of data points than a rural county. Thus, a tile including New York City or Chicago in the level of the tree for counties has many more data points than tiles including rural counties. The manifest for the tree indicates this difference between tiles. However, the manifest occupies significantly less storage than the tree. A tree stores the data for the data points in tiles at each level. The manifest stores the number of data points in each tile in each level of the tree.

As part of 204, pre-processing engine 130 may also provide other metadata for the tree. For example, the metadata might include the name of each column, unit of time for each time interval (discussed below), any change in schema between levels of the tree, statistics for each column (based on column types such as min, max, sum, average, standard deviation for numeric columns, count distinct for string columns, etc.) and other data that may be used in each visualization.

Each tile of the tree is compressed, at 206. In some embodiments, the tree is compressed in a binary format to provide a binary memory. Such a binary memory could be more efficiently sent to client 120 via bulk server 134. The manifest for the tree may also be made into a binary format and compressed at 206. Sending the data in this binary format avoids deserialization on by client 120. Client 120 can directly load these binary tiles into its memory and then access each row of the data. Because binary format is used, this deserialization is unnecessary and a significant amount of processing time may be saved.

The manifest(s) are provided to client 120, via 208. To do so, bulk server 134 sends the manifest(s) to client 120 via network 104. Generally 208, 210 and 212 (discussed below) occur during live usage of client 120, while 202 and 204 occur during pre-processing, which may occur at another time. Consequently, client 120 can use the manifest to understand the structure of the tree and request data from server 110. In pass-through mode, however, column metadata (e.g. names, types, and statistics) are sent to client 120 in lieu of the manifest. More specifically, a user of client 120 may desire to visualize, perform analytics on or otherwise utilize a portion of the dataset stored in datastore 102. Client 120 determines, based on the manifest, the level and tiles of the tree that correspond to the desired portion of the data and that have the largest number of data point consistent with client resources. To be consistent with client resources, the amount of data loaded includes not more than a maximum number of data points. In some embodiments, the maximum number of data points corresponds to the most data loadable by the client in a particular amount of time. This maximum number of data points may be determined by querying the client, detecting the client's device type and running simple benchmarks, by user input, by default or in some other manner. In some embodiments, the maximum number of data points may be one million data points. In other embodiments, the maximum number of data points may be two million data points. In other embodiments, the maximum number of data points might be three million data points. Thus, the manifest is used in determining the level and tile(s) of the tree that correspond to the desired portion of the dataset and have the largest number of data points not exceeding the maximum number of data points. These are the tile(s) that client 120 requests.

A request is received by server 110, at 210. Because client 120 has used the manifest, the request is for the tile(s) of a level of the tree that correspond to the desired portion of the data. The compressed tile(s) identified in the request are then provided to client 120, at 212. In some embodiments, one or more tile(s) are requested at 210 and provided at 212. Thus, entire tile(s) are sent from server 110 to client 120. In an alternate embodiment, client 120 may request and receive sections of data that are smaller than whole tiles. Because of the use of the manifest, client 120 may download and use the data in the tile(s) efficiently. In pass-through mode, the client does not use the manifest and instead uses the column metadata to query datastore 102.

Figure 3:
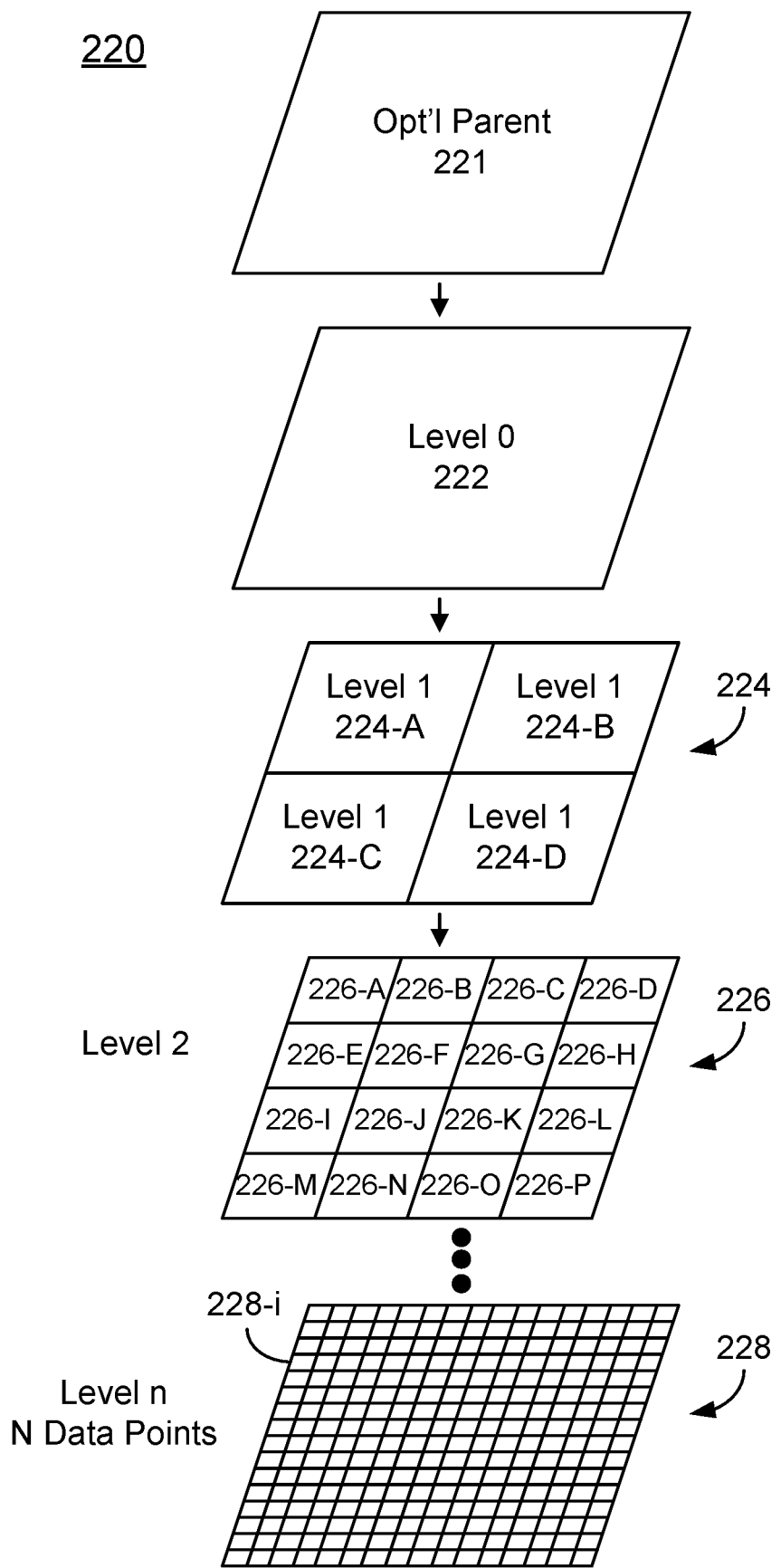
FIG. 3 is an embodiment of a tree provided using a method for providing explorable visual analytics having reduced loading latency for very large datasets.

For example, FIG. 3 depicts an embodiment of a tree 220 that is formed at 202 of method 200. Although shown as a quad tree, in other embodiments, tree 220 might be another type of tree. The root level, level zero 222, has a single tile and may hold the fewest number of data points. Level one 224 has four tiles 224-A, 224-B, 224-C and 224-D. Level one 224 typically has a larger number of data points than level zero 222. Level two 226 has sixteen tiles 226-A, 226-B, 226-C, 226-D, 226-E, 226-F, 226-G, 226-H, 226-I, 226-J, 226-K, 226-L, 226-M, 226-N, 226-O and 226-P and generally includes a larger number of data points than level one 224. This increase in tiles per level continues to the last level 228 having the largest number of tiles 228-$i$, only one of which is labeled for clarity. Level 228 also generally includes the largest number of data points. As discussed above, levels 222, 224, 226 and 228 may represent different sampling levels for the corresponding dataset. Also shown in FIG. 3 is optional parent level 221. One or more parent levels may be provided if, for example, root level 222 has a larger number of data points than desired. Parent node 221 includes a single tile and is a super-sampled version of root level 222. In other cases, parent node 221 is unnecessary and thus omitted. A manifest for tree 220 is generated at 204. Tree 220 is compressed at 208 and the manifest provided to client 120 at 208.

Figure 4:
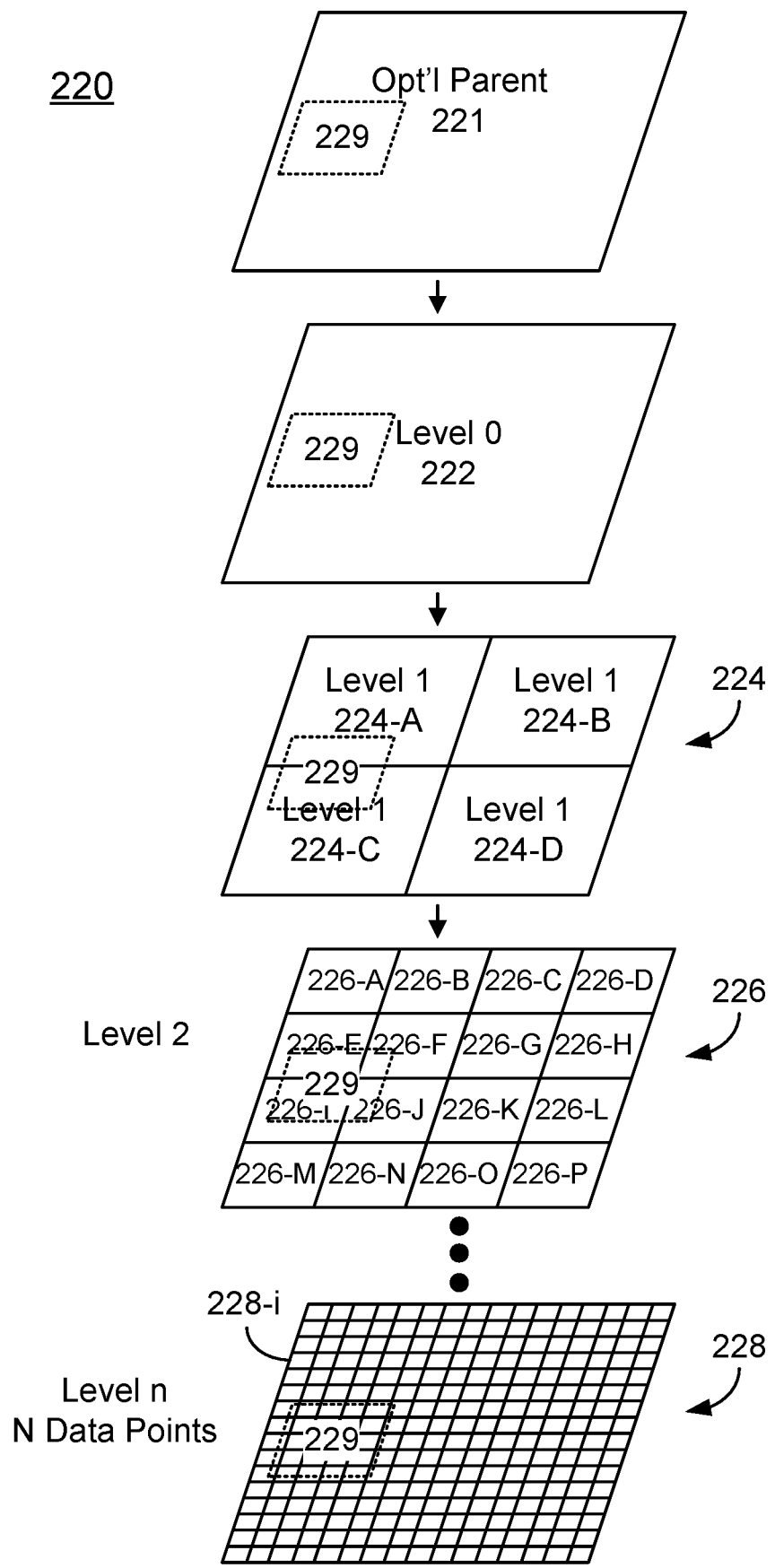
FIG. 4 is another embodiment of a tree provided using a method for providing explorable visual analytics having reduced loading latency for very large datasets.

Using the manifest, client 120 formulates a request for a portion of the dataset. The request is for tile(s) at a level of tree 220 that include the largest number of data points not exceeding the maximum number of data points. For example, FIG. 4 depicts an embodiment of tree 220 with portion 229 of the data desired by client 120. Portion 229 may correspond to a particular geographic area (e.g. latitude and longitude) in the census data example above. Suppose the maximum number of data points is one million data points and the manifest for tree 220 indicates that: level zero 222 includes four hundred thousand data points; level one 224 includes 1.6 million data points with four hundred thousand data points per tile 224-A, 224-B, 224-C and 224-D; level two 226 includes 6.4 million data points with four hundred thousand data points in each tile 226-A through 226-P; and subsequent levels include more data points. Because fewer data points are in the root level zero 222, parent level 221 may be omitted. However, if present, parent level 221 would include fewer than four hundred thousand data points. Although each tile includes the same number of data points in this example, the tiles may include different numbers of data points. Suppose also that tiles are loaded in their entirety. As is indicated in FIG. 4, tile/level 222; tiles 224-A and 224-C at level 224; tiles 226-E, 226-F, 226-I and 226-J at level 226; or a number of tiles 228-$i$ at level 228 correspond to the portion 229 of the data. Based on the manifest and portion 229 of the data, it can be determined that the tile for level zero 222 includes less than the maximum number of data points. The same is true for the tile for parent level 221, if present. Thus, the four hundred thousand points in tile/level zero 222 might be loaded. Tiles 224-A and 224-C together have eight hundred thousand data points. This is more data points than for level zero 222 but less than the maximum number of data points. Tiles 226-E, 226-F, 226-I and 226-J together have more than one million data points, which exceeds the maximum number of data points. Thus, using the manifest for tree 220, tiles 224-A and 224-C would be identified as having the largest number of data points not exceeding the maximum number of data points and that corresponds to portion 229 of the data. A request for tiles 224-A and 224-C is received by server 110 at 210. Tiles 224-A and 224-C are provided to client 120 at 212. Client 120 may then process and use data for tiles 224-A and 224-C.

Using method 200 and system 100, reduced latency of loading of data on client 120 may be achieved. Improved interactivity and scalability may also be attained. A large number of data points may be delivered to the client 120 for use with reduced latency. This is achieved by using the manifest to request tile(s) having the largest number of data points corresponding to a desired portion of the dataset that is also less than a maximum number of data points. For example, in some embodiments, up to one to two million points may be loaded on client 120 using method 200. For example, one million or two million data points can be loaded and ready for processing on client 120 in around a few seconds (typically around 2-5 seconds on a 100 Mbps network) in some embodiments. In other embodiments, other numbers of data points may be provided in set amounts of time. This large amount of data at client 120 allows for very high resolution views of the data. Further, the user may interact with the data, changing views of the data and performing some analysis using data already at client 120, either stored at memory cache 162 or disk cache 154. A round trip penalty between server 110 and client 120 may be avoided. In addition, the data may be sent in binary format, which avoids deserialization by client 120. Client 120 can directly load these binary tiles into its memory and then access each row of the data. This is in contrast to a conventional system, in which data is sent as text files and then each access to the loaded data must be deserialized and converted to a number for computations. This conversion for millions of rows of data is very time consuming. Binary format to completely avoid this deserialization and save a considerable amount of time. Thus, performance of system 100 may be further improved. Thus, high resolution visual exploration may be facilitated. These features may be achieved at a cost savings by offloading cloud computing to client 120. For example, determination of the tiles to be delivered occurs at client 120 using the manifest. Subsequent unpacking of compressed data and processing of the data are performed at client 120. Use of execution engine 140, which tracks progress of processing modules 142, allows for progressive updating of results for charts 180 or other visualizations of the data. For example, although one million data points may be loaded with reduced latency, processing of these points may take a significant amount of time even when performed in parallel. Using execution engine 140, client 120 can update the visualization as processing of the data is completed. Thus, load latency and interactivity are improved. The method and system may also be extended to include custom graphic libraries, advanced analytic algorithms and other features. Server 110 and client 120 are also scalable. For example, if system 100 and method 200 are used in conjunction with larger datasets, trees having more levels may be provided to accommodate larger numbers of data points without significantly increasing latency or, in some cases, requiring additional numbers of processors 112 for pre-processing data. Thus, performance of system 100 and method 200 for large datasets is improved.

System 100 and method 200 can be extended to account for datasets associated with multiple intervals, such as time. In the census example above, population or demographics data may be obtained for each year. In a dataset related to finances of a company, the dataset may include yearly, monthly or daily sales data for a store or division. A user may desire to compare, visualize or otherwise utilize data for different intervals that are for the same geographic area, store, or division. Consequently, a mechanism for accounting for intervals, such as time, is desired.

Figure 5:
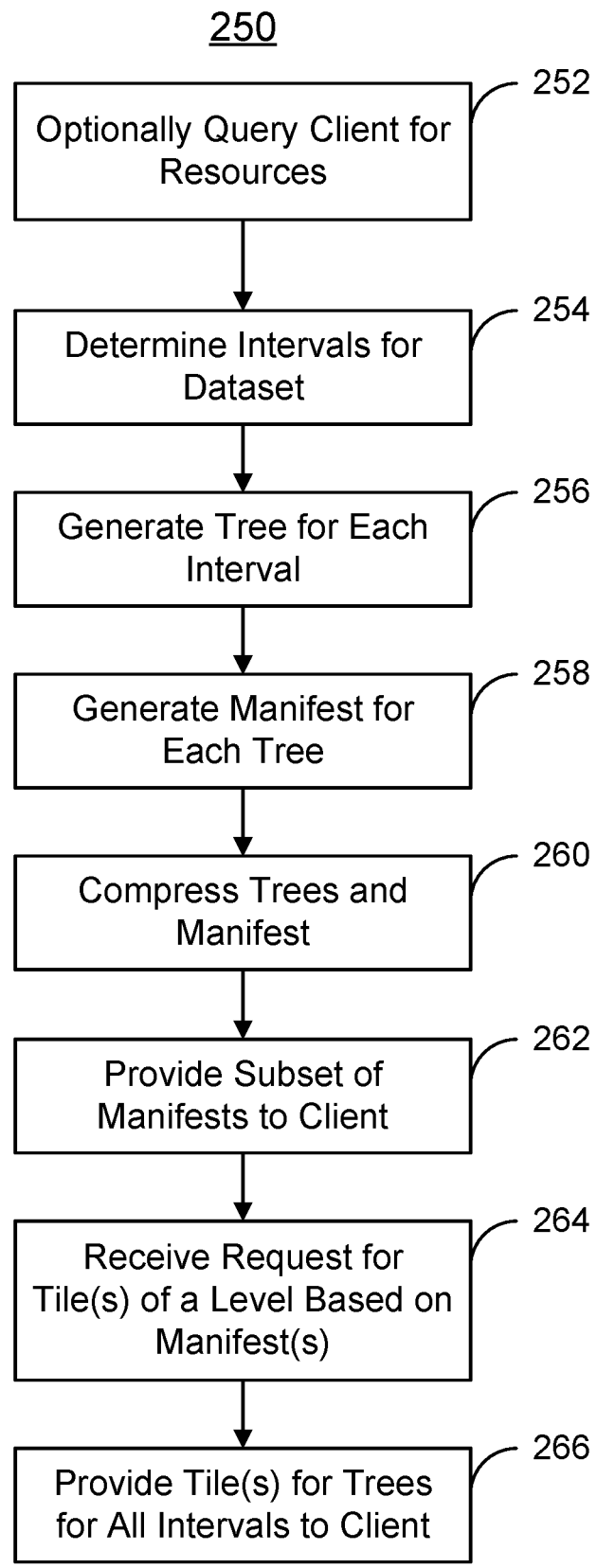
FIG. 5 is a flow chart depicting another embodiment of a method for providing explorable visual analytics having reduced loading latency for very large datasets having multiple time intervals.

FIG. 5 is a flow chart depicting an embodiment of method 250 for analyzing and visualizing a large dataset including multiple intervals. For simplicity, method 250 is described in the context of system 100. However, method 250 may be used in conjunction with other architectures. The method 250 is also described in the context of time intervals. However, nothing prevents the use of method 250 in connection with other types of intervals. The method 250 is explained in the context of a single dataset. However, the method 250 may be extended to multiple datasets which might be joined. For example, demographics data for one dataset may be joined with sales data from another dataset for analysis and visualization. In addition, the flow of method 200 is described in a particular order. However, other orders are possible and may be performed at disparate times. For example, some steps are performed during pre-processing of a dataset, while others involving communication between client 120 and server 110 are performed at run time, during live usage of client 120.

Client 120 may optionally be queried to determine client resources, at 252. For example, a certain number of data sets data points may be sent to client 120 from bulk server 134 and visualized using charts module 180. The frame rates may be returned from client 120 and reviewed to determine the maximum number of data points. Alternatively, the time taken for client 120 to perform certain operations can be measured to determine the capabilities of client 120. In another example, data points may be synthetically generated on client 120 and resulting frame rate can be recorded and used to determine the maximum number of data points loadable. Alternatively, the maximum number of data points may be predetermined in another manner. For example, this may be set by the user and/or set by a default for client 120. In some embodiments, the maximum number of data points may be one million, two million, or three million data points up to tens of millions of data points or more.

Although described in the context of method 250. Querying client 120 may be carried out for method 200, as is mentioned above for method 200. This process of querying the client can be used to determine the limitations on the number of data points loadable in a specified time and the number of manifests that are loadable. The number of data points loadable at a time is determined by the amount of RAM and the capabilities of GPU(s) 124. The number of manifests loadable is determined by the amount of RAM available. The number of loadable manifests determines how many trees can be queried at each time. This affects the maximum range of time for which data can be loaded. For example, for the census data, one tree may be created per year. Based on client resources, only three manifests might be loaded at a time. Consequently, only three years of the data can be loaded on client 120. However, the user can "move" the viewable time range for the data. For example, instead of looking at the data from 2010 to 2012, a user can move it to 2009 to 2011. Now within a time range (three years/intervals in this example), there is still a maximum number of loadable data points, such as 1 million. In this example, for the three years the user is exploring, tiles from the same level of three different trees, each corresponding to one year can be loaded. Thus, the total number of points loaded in all those tiles remains below the 1 million data point threshold. Querying the client to determine the maximum number of loadable points and also the maximum number of loadable manifests can optionally happen whether a single tree (a single time interval), multiple time intervals and/or multiple trees are generated.

The intervals for the dataset are determined during pre-processing by pre-processing engine 130, at 254. Intervals may be based upon how frequently data are collected or some other measure. For example, for census data, the intervals may be yearly. For financial data, the intervals may be daily for certain data, quarterly, yearly or another unit of time. This determination of intervals happens frequently occurs before any client is available and is based upon the characteristics of the dataset. For example, it may be decided during pre-processing that each tree should encompass one year of the data. Further, generation of the trees and manifests and compression of manifests via 256, 258 and 260, described below, are performed at pre-processing. Thus, 254, 256, 258 and 260 may occur at a distinct time from, at before, 252.

Figure 6:
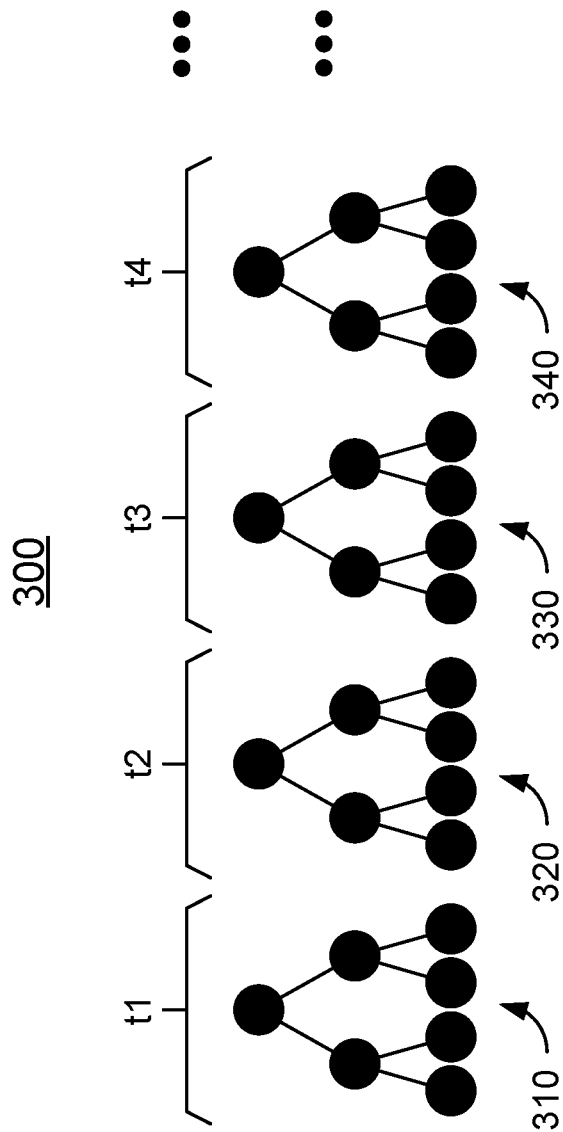
FIG. 6 is an exemplary embodiment of trees provided using a method for providing explorable visual analytics having reduced loading latency for very large datasets having multiple intervals.

A tree corresponding to the dataset is generated for each interval, via 256. Thus, 256 is analogous to 202 of the method 200. FIG. 6 depicts an embodiment of a set 300 of trees provided for multiple time intervals. In the embodiment shown, each tree corresponds to a particular interval. Tree 310 is for time interval t1; tree 320 is for time interval t2; tree 330 is for time interval t3; and tree 340 is for time interval t4. Trees for other time intervals are not depicted for simplicity. Each tree 310, 320, 330 and 340 includes three levels and is a binary tree. In other embodiments, another number of levels and/or other types of trees (e.g. quad trees or octo-trees) might be formed. Although not shown in FIG. 6, trees 310, 320, 330 and 340 may include parent level(s), as described above for tree 220. The trees built at 256 are analogous to those built at 202. Thus, the levels may represent sampling levels. The number of levels in the trees may also be determined based on the maximum number of data points defined above.

Pre-processing engine 130 provides a manifest for each tree of each interval, at 258. The manifest indicates a particular number of data points in each of the at least one tile for each level of the tree. Thus, 258 is analogous to 204 of method 200.

Each tile of each tree for each time interval is compressed, at 260. Thus, 260 is analogous to 206 of method 200. In some embodiments, the tree is compressed in a binary format to provide a binary memory. Such a binary memory can be efficiently sent to client 120 via bulk server 134. Sending the data in this binary format avoids deserialization on by client 120, making deserialization unnecessary and a significant amount of processing time may be saved. The manifest for the tree may also be compressed at 206.

The manifests corresponding to the trees for the intervals are sent to client 120, via 262. Thus, 262 is analogous to 208 of method 200. Consequently, client 120 can use the manifests to understand the structure of the tree for each interval and request data from the dataset. Client 120 determines, based on the manifests, the level and tiles of the tree that correspond to a desired portion of the data for a particular time interval and that have the largest number of data point consistent with client resources. Using the manifests, client 120 determines the largest number of data points for a desired portion of the dataset that does not exceed the maximum number of loadable data points. In addition, metadata of different (but related) datasets for trees 310, 320 and 330 are combined in one JSON file and sent to client 120. Client 120 uses this metadata to navigate between different aggregation levels, even though technically each one of the aggregation levels is a different dataset having its own manifest and tiles/trees. For a pass-through mode, manifests are not sent to client 120, as discussed above. In such an embodiment, compression at 206 may be completed on the fly in response to requests from client 120.

A request is received by server 110, at 264. Because client 120 has used the manifest, the request is for the tile(s) of a level of the tree for the desired interval. As discussed above, in some embodiments, whole tile(s) are requested by client 120 at 264. The compressed tile(s) identified in the request are then provided to client 120, at 266. In addition, the tile(s) for the corresponding level of other trees for other intervals in the viewable range are also provided at 266. In the example above in which a client is capable of loading trees for three years, the tree for the current year and two other years in the viewable range are sent to client 120 at 266. Stated differently, the tiles for the current interval (current year viewed) and other intervals (other two years in the viewable range) are sent to client 120 by server 110. In some embodiments, tile(s) in their entirety are sent to client 120 at 266.

Using method 250 and system 100, the benefits described above for method 200 may be achieved. In addition, interactivity may be improved. Because tile(s) for each interval are provided at 266, client 120 may process tile(s) not only for the interval currently of interest, but also other intervals. These tiles in binary format may be provided from server 110 to client 120. Client 120 can more rapidly process these binary format tiles, including placing tiles in a format usable by GPU(s) 124, which can buffer the tiles in memory for different intervals. GPU(s) 124 show data for a current frame and hide data for other frames. In some embodiments, a frame can correspond to an interval. In other embodiments, a frame can be for a portion of the interval than that corresponding to the tree. The user may thus rapidly and seamlessly navigate between intervals. For example, the user interface (not shown) for client 120 may include a slider corresponding to all of the time intervals in the dataset. After downloading tiles, processing tiles and sending a binary of the tiles to the GPU 124, the user may simply move a slider along a bar to rapidly change the view shown on a client display between time frames. As the slider moves to new frames, the GPU(s) 124 selectively renders data for the new frame and hides data for the previous frame. For example, in moving the slider between t1 and t3, tile(s) for tree 310 (t1) are shown first. As the slider moves to t2, tile(s) for tree 310 are then hidden and tile(s) for tree 320 shown. As the slider moves from t2 to t3, tile(s) for tree 320 are then hidden and tile(s) for tree 330 shown. In such a case, GPU(s) 124 select between intervals. In the example above, GPU(s) 124 can thus alternately show and hide visualizations for a year. As discussed above, a frame can also be smaller than an interval of a single tree. For example, each tree may include sales data for a company for an entire month. Thus, a month is the interval for the tree. However, frames may be generated for sales happening daily. The user can "zoom in" on time slider and only show the sales happening in one day and hide the other ones, although all the sales transactions for a month are already loaded in the corresponding tile. Little or no delay in changing visualizations may be achieved. Thus, a user may be better able to visualize data for different time intervals.

Figure 7:
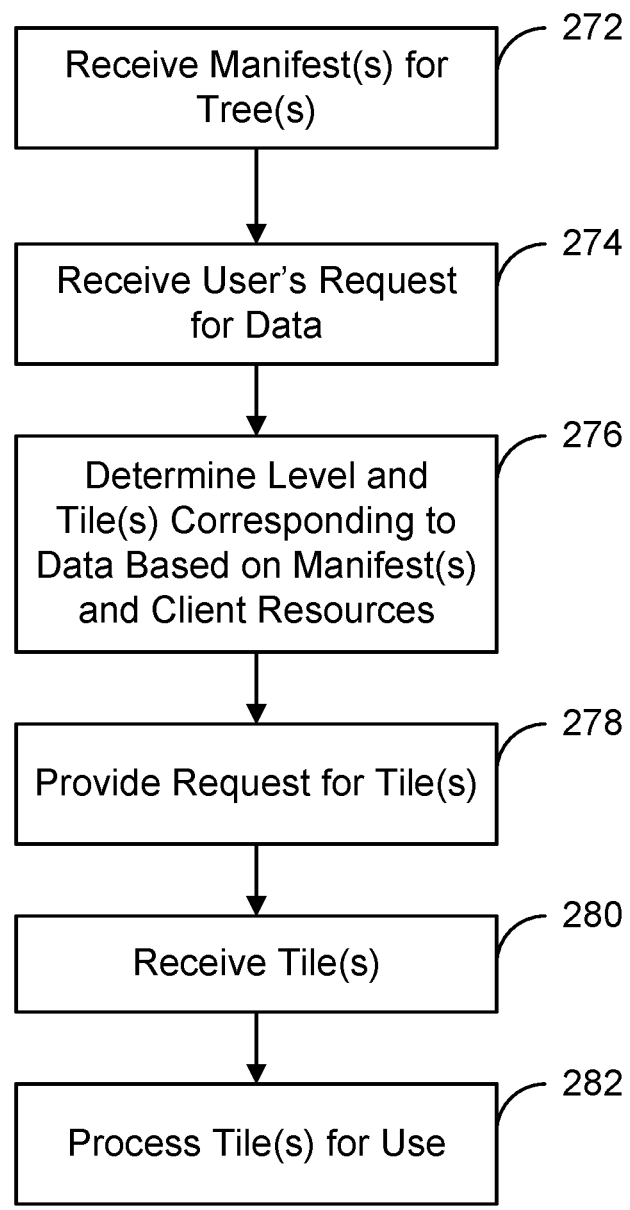
FIG. 7 is another embodiment of a method for providing explorable visual analytics having reduced loading latency for very large datasets.

FIG. 7 is a flow chart depicting an embodiment of method 270 for analyzing and visualizing a large dataset including multiple intervals. For simplicity, method 270 is described in the context of system 100. However, method 270 may be used in conjunction with other architectures. The method 270 is explained in the context of a single dataset. However, the method 270 may be extended to multiple datasets which might be joined. For example, demographics data for one dataset may be joined with sales data from another data set for analysis and visualization. The method 270 may start after the client has been queried to determine client resources or another mechanism for determining the maximum number of data points loaded in a specified amount of time has been carried out. Similarly, intervals corresponding to the dataset, trees and manifests may have already been provided at server 110, for example using method(s) 200 and/or 250.

The manifest(s) for the tree(s) are received by client 120, via 272. Other data, such as the metadata described above, may also be received. However, because the manifest(s) are used in requests for data, priority may be given to downloading and processing manifest(s).

A request for a portion of the data in the dataset is received by client 120, at 274. For example, a user may select a region of a map or other visualization in order to obtain or change data being utilized. Based on the manifest(s), client 120, determines the level and tile(s) of the tree(s) that correspond to a desired portion of the data and that have the largest number of data point consistent with client resources, via 276. For example, using the manifest(s), dataset module 160 determines the tile(s) and provides an identification of the tile(s) to download manager 150. The tile(s) identified by dataset module 160 include a total number of data points not exceeding the maximum number of data points described above and are from a level of the tree adjoining and closer to the root level that the level at which the total number of data points in the request would exceed the maximum number of data points. A request for the tile(s) is sent by download manager 150 of client 120 to server 110, at 278. The request is serviced and the requested tile(s) receive, at 280.

The received tile(s) are processed for use by client 120, via 282. At 282, download manager 150 may download and cache in disk cache 154 the compressed tile(s) provided by server 110. Using data prep worker(s) 152, the tile(s) are unpacked and otherwise processed for use by client 120. For example, processing of shapes may also be performed. Download manager 150 may also control queueing and other aspects of preparation of the data. The data are provided to dataset module 160, which stores the data. Dataset module 160 also provides a copy of the data to execution engine 140, which manages parallel processing of the data by processing modules(s) 142. In some embodiments, dataset module 160 or other component of client 120 can also split the data in a tile into parts for processing in parallel. In other embodiments, the parts into which individual tiles may be split are defined by server 110. In some embodiments, processing module(s) 142 are implemented as Web Workers allowing use of all CPU 122 cores in parallel. Consequently, the main execution thread of client 120 is not blocked by processing of the data. Thus, the user interface (not shown) for client 120 is responsive and not blocked despite significant calculations performed in the background by client 120. Execution engine 140 may thus control splitting of data into parts for processing (if not performed by dataset module 160 or server 110), instantiation of and processing in modules 142, collection of intermediate states and final results, and providing the results, for example to filter module 170 and charts 180 for rendering. As part of processing, execution engine 140 may track progress and provide periodic updates. For example, when a portion of the data points have been processed, execution engine 140 may provide the results to charts 180, which can update the view shown to the user. Updates can continue in an analogous fashion until processing is completed. Thus, initial results may be rapidly shown to the user and then updated as additional results become available. Further, if the user changes the view or for other reasons no longer needs data being processed, execution engine 140 may stop execution mid-processing discard unneeded data. Consequently, processing resources may be saved and the desired results more quickly provided. In some embodiments, double processing of data may also be reduced or eliminated.

For example, suppose a user desires to visualize two charts (e.g. two maps) that have some overlap. Both maps may include the same part of the same city plus other parts that are unique to each map. When processing each map, the tiles required for each map are determined. In this case, some tiles are used by both maps. Instead of processing each tile twice (once for each chart), tiles in both maps are processed once and the result sent to both maps. This can be extended to more than two charts. The need to redo exact processes that lead to the same result can be avoided. Efficiency of processing the data provided by server 110 may be further improved. Client 120 may also provide the binary memory or a processed result of the binary memory to GPU 124 memory for the final visual rendering or directly output the results to files or table. In some embodiments, the data are split into multiple binary chunks and provided to the GPU memory. Each binary chunk has many data points inside it that are not translated into individual objects in the system and are kept in the binary format for faster processing and much lower memory overhead. This is in contrast to conventional systems that generate multiple data objects on the client, typically one object per each data element. Client 120 may thus have only a one or a few binary memory blocks to render instead of (potentially) millions of objects. In such embodiments, the GPU 124 can render the binary memory on the fly, allowing for millions of points to be loaded at multiple frames per second (e.g. up to 60 frames/sec) without crashing the browser. Thus, viewing latency as well as loading latency for client 120 may be further reduced.

Using method 270 and system 100, the benefits described above for methods 200 and/or 250 may be achieved. As discussed above, the latency in loading data may be reduced and viewing of data across intervals improved. Interactivity may be further improved. Because client 120 efficiently processes and render data as described above, latency for updates of the user's view may be significantly reduced. For example, visualizations may be progressively updated and/or processing performed more efficiently. Consequently, a user is better able to visualize, explore and perform analytics on the dataset.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   for rendering at least a portion of a dataset on a client, providing, using a processor, a tree corresponding to the dataset having a number of data points, the tree having a plurality of levels, each of the plurality of levels including a portion of the number of data points organized into at least one tile, wherein a deeper level of the tree includes more data points than the client can load in a particular amount of time, wherein the portion of the number of data points for a deepest level of the tree provides a more accurate view of the dataset when rendered on the client, a quantity of levels in the plurality of levels being based on the number of data points in the data set and at least one client resource of the client, the client being remote from the processor and having a client memory and at least one client processor;

generating, using the processor, a manifest for the tree, the manifest indicating a particular number of data points in each of the at least one tile;
   providing the manifest to the client;
   receiving, from the client, a request for a portion of the at least one tile of a level of the plurality of levels, the portion of the at least one tile for the level corresponding to a portion of the dataset and being determined based on the manifest, the portion of the at least one tile including not more than a maximum number of data points corresponding to the at least one client resource; and
   sending, to the client in response to the request, the portion of the at least one tile including not more than the maximum number of data points corresponding to the at least one client resource.

2. The method of claim 1, wherein a first level of the plurality of levels includes not more than the maximum number of data points and a second level of the plurality of levels includes the number of data points, the maximum number of data points being selected from a predetermined maximum number of data points and a calculated maximum number of data points based on a query of the at least one client resource.

3. The method of claim 1, wherein a first level is a root level of the tree and a second level is a highest level of the tree, a portion of the plurality of levels between the root level and the highest level hierarchically including numbers of data points between the maximum number of data points and the number of data points.

4. The method of claim 1, wherein the plurality of levels correspond to a plurality of aggregation levels for the dataset.

5. The method of claim 1, wherein each of the at least one tile includes not more than the maximum number of data points corresponding to the at least one client resource.

6. The method of claim 1, wherein the dataset is a portion of a first dataset, the first dataset including the dataset and a second dataset, the tree and the dataset corresponding to a first interval, the second dataset having a second number of data points and corresponding to a second interval, the method further comprising:
   providing, using the processor, a second tree for the second dataset and the second interval, the second tree having a second plurality of levels, each of the second plurality of levels including a second portion of the second number of data points organized into at least a second tile, a second quantity of levels in the second plurality of levels being based on the second number of data points in the dataset and the at least one client resource of the client; and
   providing, using the processor, an additional manifest for the second tree, the additional manifest indicating an additional number of data points in each of the at least the second tile for each level of the second tree.

7. The method of claim 6, wherein the providing the manifest includes:
   providing the manifest and a second manifest to the client; and wherein the method further includes
   sending, in response to the request, the portion of the at least one tile from the tree for the first interval and a second portion of the at least the second tile of a second level from the second tree for the second interval, the second portion of the at least the second tile corresponding to the portion of the at least one tile.

8. A method, comprising:
for rendering at least a portion of a dataset on a client, providing, using a processor, a tree corresponding to the dataset having a number of data points, the tree having a plurality of levels, each of the plurality of levels including a portion of the number of data points organized into at least one tile, wherein a deeper level of the tree includes more data points than the client can load in a particular amount of time, wherein the portion of the number of data points for a deepest level of the tree provides a more accurate view of the dataset when rendered on the client, a quantity of levels in the plurality of levels being based on the number of data points in the data set and at least one client resource of the client;
generating, using the processor, a manifest for the tree, the manifest indicating a particular number of data points in each of the at least one tile;
providing the manifest to the client;
receiving, from the client, a request for a portion of the at least one tile of a level of the plurality of levels, the portion of the at least one tile for the level corresponding to a portion of the dataset and being determined based on the manifest, the portion of the at least one tile including not more than a maximum number of data points corresponding to the at least one client resource; and
sending, to the client in response to the request, the portion of the at least one tile including not more than the maximum number of data points corresponding to the at least one client resource;
wherein the plurality of levels corresponds to a plurality of sampling ratios for the dataset.

9. A system, comprising:
a processor configured to:
for rendering at least a portion of a dataset on a client, provide a tree corresponding to the dataset having a number of data points, the tree having a plurality of levels, each of the plurality of levels including a portion of the number of data points organized into at least one tile, wherein a deeper level of the tree includes more data points than the client can load in a particular amount of time, wherein the portion of the number of data points for a deepest level of the tree provides a more accurate view of the dataset when rendered on the client, a quantity of levels in the plurality of levels being based on the number of data points in the data set and at least one client resource of the client, the client being remote from the processor and having the client memory and at least one client processor;
generate a manifest for the tree, the manifest indicating a particular number of data points in each of the at least one tile;
provide the manifest to the client;
receive, from the client, a request for a portion of the at least one tile of a level of the plurality of levels, the portion of the at least one tile for the level corresponding to a portion of the dataset and being determined based on the manifest, the portion of the at least one tile including not more than a maximum number of data points corresponding to the at least one client resource; and
send, to the client in response to the request, the portion of the at least one tile including not more than the maximum number of data points corresponding to the at least one client resource; and
a memory coupled to the processor and configured to provide the processor with instructions.

10. The system of claim 9, wherein a first level of the plurality of levels includes not more than the maximum number of data points and a second level of the plurality of levels includes the number of data points, the maximum number of data points being selected from a predetermined maximum number of data points and a calculated maximum number of data points based on a query of the at least one client resource.

11. The system of claim 9, wherein a first level is a root level of the tree, and a second level is a highest level of the tree, a portion of the plurality of levels between the root level and the highest level hierarchically including numbers of data points between the maximum number of data points and the number of data points.

12. The system of claim 9, wherein the plurality of levels corresponds to a plurality of aggregation levels for the dataset.

13. The system of claim 9, wherein each of the at least one tile includes not more than the maximum number of data points corresponding to the at least one client resource.

14. The system of claim 9, wherein the dataset is a portion of a first dataset, the first dataset including the dataset and a second dataset, the tree and the dataset corresponding to a first interval, the second dataset having a second number of data points and corresponding to a second interval, and wherein the processor is further configured to:
provide a second tree for the second dataset and the second interval, the second tree having a second plurality of levels, each of the second plurality of levels including a second portion of the second number of data points organized into at least a second tile, a second quantity of levels in the second plurality of levels being based on the second number of data points in the dataset and the at least one client resource of the client; and
provide an additional manifest for the second tree, the additional manifest indicating an additional number of data points in each of the at least the second tile for each level of the second tree.

15. The system of claim 14, wherein to provide the manifest, the processor is further configured to:
provide the manifest and a second manifest to the client; and wherein the processor is further configured to,
send, in response to the request, the portion of the at least one tile from the tree for the first interval and a second portion of the at least the second tile of a second level from the second tree for the second interval, the second portion of the at least the second tile corresponding to the portion of the at least one tile.

16. A system, comprising:
a processor configured to:
for rendering at least a portion of a dataset on a client, provide a tree corresponding to the dataset having a number of data points, the tree having a plurality of levels, each of the plurality of levels including a portion of the number of data points organized into at least one tile, wherein a deeper level of the tree includes more data points than the client can load in a particular amount of time, wherein the portion of the number of data points for a deepest level of the tree provides a more accurate view of the dataset when rendered on the client, a quantity of levels in the plurality of levels being based on the number of data points in the data set and at least one client resource of the client;

generate a manifest for the tree, the manifest indicating a particular number of data points in each of the at least one tile;

provide the manifest to the client;

receive, from the client, a request for a portion of the at least one tile of a level of the plurality of levels, the portion of the at least one tile for the level corresponding to a portion of the dataset and being determined based on the manifest, the portion of the at least one tile including not more than a maximum number of data points corresponding to the at least one client resource; and send, to the client in response to the request, the portion of the at least one tile including not more than the maximum number of data points corresponding to the at least one client resource; and a memory coupled to the processor and configured to provide the processor with instructions;

wherein the plurality of levels corresponds to a plurality of sampling ratios for the dataset.

17. A computer program product for processing a dataset having a number of data points, the computer program product being embodied in a nontransitory computer readable storage medium and comprising computer instructions for:

for rendering at least a portion of the dataset on a client, providing a tree corresponding to the dataset, the tree having a plurality of levels, each of the plurality of levels including a portion of the number of data points organized into at least one tile, wherein a deeper level of the tree includes more data points than the client can load in a particular amount of time, wherein the portion of the number of data points for a deepest level of the tree provides a more accurate view of the dataset when rendered on the client, a quantity of levels in the plurality of levels being based on the number of data points in the data set and at least one client resource of the client, the client being remote from a processor and having a memory and at least one client processor;

providing a manifest for the tree, the manifest indicating a particular number of data points in each of the at least one tile for each level of the tree;

providing the manifest to the client;

receiving a request for a portion of the dataset from the client based on the manifest, the portion of the dataset corresponding to a level of the plurality of levels of the tree and at least a portion of the at least one tile for the level, the portion of the dataset including not more than a maximum number of data points corresponding to the at least one client resource; and sending, to the client in response to the request, the portion of the at least one tile including not more than the maximum number of data points corresponding to the at least one client resource.

18. The computer program product of claim 17, wherein a first level of the plurality of levels includes not more than the maximum number of data points and a second level of the plurality of levels includes the number of data points, the maximum number of data points being selected from a predetermined maximum number of data points and a calculated maximum number of data points based on a query of the at least one client resource.

19. The computer program product of claim 17, wherein the plurality of levels correspond to a plurality of aggregation levels for the dataset.

20. The computer program product of claim 17, wherein each of the at least one tile includes not more than the maximum number of data points corresponding to the at least one client resource.

* * * * *